Patented July 3, 1945

UNITED STATES PATENT OFFICE 2,379,646

2,379,646

METHOD OF PREPARING NONTURBID HOMOGENEOUS SOLUTIONS AND DISPERSIONS OF COLLOIDS AND PRODUCTS SO PREPARED

Fritz W. H. Mueller, Binghamton, N. Y., assignor to General Aniline & Film Corporation, New York, N. Y., a corporation of Delaware No Drawing. Application September 20, 1940, Serial No. 357,608

15 Claims. (Cl. 106—205)

The present invention relates to a method of preparing non-turbid solutions or dispersions from carbohydrate-containing gums which upon casting may be converted into a non-turbid film or layer suitable for use particularly in photography. The invention also embraces the non-turbid solutions and dispersions and the layers prepared therefrom.

The carbohydrate-containing gums (pages 490 et seq., vol. III and pages 112 et seq., vol. I of "Dictionary of Applied Chemistry," by Thorpe) which are colloidal in character have inherent film-forming possibilities. Among such gums may be mentioned the alginates, pectin, agar-agar, Carageen (*Chondrus crispus*), extracts of lichen (*Cetraria islandica*) and the like. For instance, they have potential possibilities in the photographic field in the formation of adhesive layers for strip film, soluble surface and back coating layers and the like. The potentialities of these materials, however, have never been realized, due to the fact that it was heretofore impossible to prepare absolutely non-turbid, clear solutions or dispersions capable of drying with a smooth surface and without showing inhomogeneities in structure. It is believed to be manifest that in photography the layers of film must be clear, transparent, free from haze and capable of forming entirely smooth surfaces, in order for the film to be adequate for the purposes intended. Because of the tendency of the gums in question to produce turbid solutions, the solutions thereof when cast lead to layers incapable of giving the desired smoothness of surface and transparency.

It is known that the turbidity of the aqueous solutions or dispersions of animal colloids like gelatine is caused by insoluble inorganic salts usually formed by the alkaline earth metals, calcium in particular. These inorganic salts, such as calcium phosphate, are capable of ionization at a certain pH and, as a consequence, may be entirely removed from the colloids by dialysis or electro-dialysis or chemically by precipitation with suitable acids, the anions of which will precipitate calcium ions, as for instance oxalic acid and the like. Neither of these two methods, however, is satisfactory for removing the turbidity from the carbohydrate-containing colloids such as those mentioned above. Investigations have shown that unlike animal colloids, the carbohydrate-containing gums contain alkaline earth metals in an organically bound, non-ionized rather than in an inorganically bound condition. It is known that in contrast to such colloids as gelatine, a protein, the building units (amino-acids) of which do not form insoluble alkaline earth metal salts, certain colloids of carbohydrate character possess building units chiefly consisting of hexuronic acids. These hexuronic acids are usually aggregated either in chain or ring structure (see: Hinton, Fruit Pectins, 1940), which form completely insoluble salts such as calcium pectate or calcium alginate.

Such natural colloids as pectin may possess varying calcium content depending on the handling of the extracts. The calcium salts present in fruit juices and extracts provide the source of the calcium which at least partially neutralizes carboxylic groups of pectin becoming exposed by unavoidable partial deesterification owing to pectase action. If the deesterification proceeds too far, the character of the calcium salts formed begins to approach that of the completely demethylated pectic acid and the tendency of pectin to become insoluble increases.

In other extracts of carbohydrate-containing gums, as Carageen, *Laminaria digitata*, and the like, the action of enzymes easily sets free carboxylic groups, which may then form insoluble calcium salts, thus binding in a non-ionizable form the calcium or alkaline earth metals, usually abundantly present in such extracts.

It is obvious that the dialysis method is incapable of effecting removal of the organically bound calcium in these cases. It has been stated that the chemical precipitation method was unsuccessful. When resorting to this method, it was found that calcium precipitating acids effect a degradation of the colloids which resulted in a great reduction in the viscosity thereof or in the gelling power. The viscosity and the gel strength is a very desirable feature in the practical application of the colloidal solutions and therefore the great reduction thereof by the precipitation method makes this method unsatisfactory. In addition this method often leads to the inclusion in the solutions of other undesirable anions.

In the case of pectin the acid treatment would primarily cause de-esterification and partially convert the pectin to pectic acid, the acid groups of which bind calcium, even taking it from tap water, thereby making the application of this colloid more unsuitable for photographic purposes. It is therefore the organically bound calcium occurring in carbohydrate-containing gums which has prevented the application of these colloids for photographic purposes.

I have now discovered that the chemical agents known to the art as water-softening agents, which remove the hardness from water by a conversion of the salts causing the hardness to water soluble salts, can dissolve these insoluble organic calcium compounds and thus counteract, even without their removal, their deleterious effects on the homogeneity of the solution so vitally necessary for photographic purposes.

Suitable softening agents which remove the hardness from water by conversion of the salts, causing the hardness, to water soluble salts are the alkali metal hexametaphosphates, particularly the sodium salt, the alkali metal salts of polyamino-polycarboxylic acids (U. S. P. 2,130,505), the alkali metal salts of trimethylaminotricarboxylic acids (U. S. P. 2,168,181), and the like. The chemical mechanism by which the conversion is effected, is not definitely known. It is possible that the water-softening agents operate in the aqueous solutions and dispersions of the colloids in the same manner as they do in removing the hardness of water. At any rate, despite the insolubility of the organic calcium salts and the complexity of the composition of the colloids, the water-softening agents convert these calcium salts to the soluble state without any detrimental effect upon the colloid itself. The utilization of such water-softening agents to produce non-turbid solutions and dispersions capable of being cast to form non-turbid layers of carbohydrate-containing gums, layers of this character and compositions for producing the same comprise the objects of this invention.

The invention may be utilized in many ways. For instance in co-pending application Serial No. 285,498, filed July 20, 1939, now U. S. P. 2,275,617, it has been proposed to form adhesive layers for strip film from vegetable mucilages. In such cases a smooth and even surface of the adhesive layer is of greatest interest to insure the production of a smooth permanent support. The addition to the vegetable mucilages of the water-softening agents, such as those previously mentioned, results in a decided improvement in the adhesive layers contemplated by said application. Again it is often desirable to completely dissolve surface-, anti-abrasion-, anti-halation coatings and the like consisting of vegetable mucilages after these layers have served their purpose. By incorporation of the water-softening agents such complete solution is facilitated by reason of the fact that the agents prevent the formation of insoluble calcium salts in processing solutions made up with ordinary tap water or during the washing of the film. In addition there are instances in which it is desirable to produce photographic layers containing carbonates, sulfates, oxalates, oleates, or other fatty acid radicals. Difficulties due to turbidity often result when the layers are composed of the carbohydrate-containing gums. It has been found that no precipitation leading to turbidity ensues upon the addition of such salts if a water-softening agent is included in the layer.

The amount of the water-softening agent which should be employed varies depending upon the content of alkaline earth metal present in the gum or colloid. It is, however, a simple expedient to ascertain the amount of the water-softening agent which should be employed by adding the water-softening agent to the solution or dispersion until a test sample shows no sign of turbidity after being cast and dried.

The following examples serve to illustrate the invention, although it is to be understood that the invention is not restricted thereto:

Example 1

0.1 to 3% of sodium or ammonium alginate is dissolved in 0.2 to 0.5% solution of sodium hexametaphosphate (Calgon). This amount is usually required to bring the insoluble salts contained in the alginate into complete solution. The solution may then serve as a surface coating or as an anti-halation coating.

Example 2

An adhesive is prepared from the composition of Example 1 and to expedite the spreading thereof, there is added a small amount of an amide such as is described in U. S. P. 1,932,179. The hexametaphosphate operates to prevent any formation of an insoluble calcium salt of these wetting agents, when the film bearing the adhesive contacts water containing calcium ions.

Example 3

A solution is prepared as described in Example 1, but there is used in lieu of sodium hexametaphosphate, the sodium salt of the polyamino-polycarboxylic acid of Example 1 of U. S. P. 2,130,505.

Example 4

A solution is prepared as described in Example 1, except for the fact that the water-softening agent is the sodium salt of trimethylamino-tricarboxylic acid of U. S. P. 2,168,181.

Example 5

An extract of 5 kg. Carageen (*Chondrus crispus*) is made with 100 liters of 3% acetic acid at room temperature. The solution is filtered, then heated to 100° C. to effect partial hydrolysis and thereafter quickly cooled. The partial hydrolysis of this and similar materials either by acids or by the action of enzymes to condition them for use especially as adhesives, is described in detail in my application Ser. No. 357,609, filed September 20, 1940, entitled "Soluble photographic layers of colloidal gums and process of conditioning such gums for such use," which has matured into Patent No. 2,330,905, dated October 5, 1943. To this extract a sufficient amount of sodium hexametaphosphate is added to clear up the turbidity always present in Carageen extracts. The solution then may be cast to produce an adhesive layer, surface-, or anti-halation coating.

Example 6

0.1 to 4% of pectin is dissolved in 0.2 to 0.5% solution of sodium hexametaphosphate. This amount is usually sufficient to clear up any turbidity of pectin solutions from various origin (apples, citrus fruits, etc.). The solution may then serve as a surface coating or as an anti-halation coating or as an adhesive layer.

Now therefore I claim:

1. A process for conditioning carbohydrate-containing gums for use in forming non-turbid photographic layers which comprises adding to an aqueous solution or dispersion of such gums an amount of a water-soluble water-softening agent sufficient to effectively convert the alkaline earth metal salt thereof into water-soluble salts.

2. The process as defined in claim 1, wherein the water-softening agent is an alkali metal salt of hexametaphosphate.

3. The process as defined in claim 1, wherein the water-softening agent is an alkali metal salt of a polyamino-polycarboxylic acid.

4. The process as defined in claim 1, wherein the water-softening agent is an alkali metal salt of trimethylamino-tricarboxylic acid.

5. A composition capable of forming non-turbid photographic layers on casting thereof, comprising an aqueous solution or dispersion of a carbohydrate-containing gum and a small amount of a water-soluble water-softening agent capable of effectively converting the water-insoluble alkaline earth metal salts of the gum into water-soluble salts.

6. A composition capable of forming non-turbid photographic layers on casting thereof, comprising an aqueous solution or dispersion of a vegetable gum and a small amount of sodium hexametaphosphate.

7. A composition capable of forming non-turbid photographic layers on casting thereof, comprising an aqueous solution or dispersion of a vegetable gum and a small amount of a water soluble salt of a polyamino-polycarboxylic acid.

8. A composition capable of forming non-turbid photographic layers on casting thereof, comprising an aqueous solution or dispersion of a vegetable gum and a small amount of a water soluble salt of a trimethylaminotricarboxylic acid.

9. Non-turbid photographic adhesive layers of the composition of claim 5.

10. Non-turbid photographic adhesive layers of the composition of claim 6.

11. Non-turbid photographic adhesive layers of the composition of claim 7.

12. Non-turbid photographic adhesive layers of the composition of claim 8.

13. The process as defined in claim 1 wherein the carbohydrate-containing gum is sodium alginate and the water-softening agent is sodium hexametaphosphate.

14. The process as defined in claim 1 wherein the carbohydrate-containing gum is pectin and the water-softening agent is sodium hexametaphosphate.

15. The process as defined in claim 1 wherein the carbohydrate-containing gum is ammonium alginate and the water-softening agent is a polyamino-polycarboxylic acid.

FRITZ W. H. MUELLER.